US008767691B2

(12) United States Patent
Li et al.

(10) Patent No.: US 8,767,691 B2
(45) Date of Patent: Jul. 1, 2014

(54) METHOD AND APPARATUS FOR SCHEDULING TRANSMISSIONS FOR ANTENNA ARRAYS

(75) Inventors: Li Erran Li, Edison, NJ (US); Thomas Marzetta, Summit, NJ (US)

(73) Assignee: Alcatel Lucent, Paris (FR)

( * ) Notice: Subject to any disclaimer, the term of this patent is extended or adjusted under 35 U.S.C. 154(b) by 350 days.

(21) Appl. No.: 13/236,467

(22) Filed: Sep. 19, 2011

(65) Prior Publication Data
US 2013/0070741 A1    Mar. 21, 2013

(51) Int. Cl.
| | | |
|---|---|---|
| H04Q 7/24 | (2006.01) | |
| H04W 84/12 | (2009.01) | |
| H04W 88/06 | (2009.01) | |
| H04W 74/08 | (2009.01) | |
| H04W 80/04 | (2009.01) | |
| H04W 84/18 | (2009.01) | |

(52) U.S. Cl.
CPC ............ *H04W 84/12* (2013.01); *H04W 88/06* (2013.01); *H04W 74/08* (2013.01); *H04W 80/04* (2013.01); *H04W 84/18* (2013.01)
USPC ........................................................ 370/338

(58) Field of Classification Search
None
See application file for complete search history.

(56) References Cited

U.S. PATENT DOCUMENTS

| 2005/0277444 | A1 | 12/2005 | Rensburg et al. ......... 455/562.1 |
| 2006/0182077 | A1* | 8/2006 | Scherzer et al. ............. 370/338 |
| 2006/0281494 | A1 | 12/2006 | Wilson et al. .............. 455/562.1 |
| 2007/0115800 | A1* | 5/2007 | Fonseka et al. .............. 370/208 |
| 2007/0153754 | A1 | 7/2007 | Shapira et al. ............... 370/338 |
| 2007/0198702 | A1* | 8/2007 | Bishop .......................... 709/224 |
| 2008/0260073 | A1* | 10/2008 | Jin et al. ......................... 375/340 |
| 2009/0161616 | A1* | 6/2009 | Ramesh et al. .............. 370/329 |
| 2009/0316627 | A1* | 12/2009 | Fonseka et al. .............. 370/328 |
| 2011/0096708 | A1* | 4/2011 | Novak et al. .................. 370/311 |
| 2011/0164596 | A1* | 7/2011 | Montemurro et al. ........ 370/338 |
| 2011/0207474 | A1* | 8/2011 | Hazzani et al. ............. 455/456.1 |

OTHER PUBLICATIONS

Ehsan Aryafar, Narendra Anand, Theodoros Salonidis, Edward W. Knightly. Design and Experimental Evaluation of Multi-User Beamforming in Wireless LANs. In Proceedings of MOBICOM'2010. pp. 197-208.

M. Costa (May 1983). "Writing on dirty paper". *IEEE Trans. Information Theory* 29 (3): 439-441, 1983.

G. Dimic and N. Sidiropoulos. On Downlink Beamforming with Greedy User Selection: Performance Analysis and a Simple New Algorithm, *Signal Processing, IEEE Transactions on*,53(10):3857-3868, Oct. 2005.

H. Ngo, T.L. Marzetta, and E.G. Larsson. Analysis of the Pilot Contamination Effect in Very Large Multicell Multiuser MIMO systems for physical models. In *Proc. IEEE Int. Conf. Acoustics Speech, and Signal Processing*, May 20, 2011.

(Continued)

Primary Examiner — Hassan Phillips
Assistant Examiner — Prenell Jones
(74) Attorney, Agent, or Firm — Davidson Sheehan, LLP

(57) ABSTRACT

Embodiments of the claimed subject matter provide a method and apparatus for scheduling transmissions for an antenna array. One embodiment of the method includes scheduling a subset of a plurality of packets for concurrent transmission over an air interface to a corresponding subset of a plurality of wireless-enabled terminals. The subset is selected based on information indicating locations of the subset of the plurality of wireless-enabled terminals. This embodiment of the method also includes concurrently transmitting the subset of the plurality of packets using a plurality of antennas.

19 Claims, 5 Drawing Sheets

(56) References Cited

OTHER PUBLICATIONS

Z. Shen, R. Chen, J., Andrews, R. Heath, and B. Evans. Low Complexity User Selection Algorithms for Multiuser MIMO Systems with Block Diagonalization. In *Signals, Systems and Computers, 2005. Conference Record of the Thirty-Ninth Asilomar Conference*, pp. 628-632, Nov. 1, 2005.

International PCT/US2012/055417 Search Report dated Dec. 21, 2012.

Written Opinion dated Dec. 21, 2012.

* cited by examiner

```
01. Estimate AoA of each terminal
02. Pick the packet pkt₁ that needs to be scheduled
03. Initialize PKT = {pkt₁}
04. nextIter = true
05. while (nextIter is true) {
06.     nextIter = false
07.     r_sum = computeSumRate(PKT)
08.     r'_sum = ADD(PKT) //try ADD operation
09.     if r'_sum > r_sum
10.         set nextIter to true and goto line 05
11.     r'_sum = REMOVE(PKT) //try REMOVE operation
12.     if r'_sum > r_sum
13.         set nextIter to true and goto line 05
14.     r'_sum = SWAP(PKT) // try SWAP operation
15.     if r'_sum > r_sum
16.         set nextIter to true and goto line 05
17. }
```

Figure 4

METHOD AND APPARATUS FOR SCHEDULING TRANSMISSIONS FOR ANTENNA ARRAYS

BACKGROUND

This application relates generally to communication systems, and, more particularly, to wireless communication systems.

Wireless communication systems typically deploy numerous base stations (or other types of wireless access points such as eNodeBs) for providing wireless connectivity to user equipment such as mobile units or other wireless-enabled devices. Each base station is responsible for providing wireless connectivity to the mobile units located in a particular cell or sector served by the base station. The air interface between the base station and the mobile unit supports downlink (or forward link) channels for carrying information from the base station to the mobile unit and uplink (or reverse link) channels for carrying information from the mobile unit to the base station. The uplink and/or downlink channels typically include data channels for carrying data traffic such as voice information and control channels for carrying control signal such as pilot signals, synchronization signals, acknowledgment signals, and the like.

Multiple-input-multiple-output (MIMO) techniques may be employed when the base station and, optionally, the user terminals include multiple antennas. For example, a base station that includes multiple antennas can transmit multiple independent and distinct signals to multiple users concurrently and on the same frequency band. MIMO techniques are capable of increasing the spectral efficiency (e.g., the number of bits/second/Hertz) of the wireless communication system roughly in proportion to the number of antennas available at the base station. However, the base station also requires information about the state of the downlink channel(s) to each of the users to select users that have approximately orthogonal downlink channels for concurrent transmission. The channel feedback may be provided by the users on the reverse link, but this increases overhead associated with the MIMO transmissions, which reduces the spectral efficiency of the wireless communication system.

Random fluctuations in the channel states can create sets of downlink channels that are approximately orthogonal. Thus, if the number of users associated with a base station is large, these random fluctuations naturally tend to create groups of users that have approximately orthogonal downlink channels. Opportunistic MIMO schemes identify these groups of users so that the interference between the concurrent transmissions from the base station to the users in the selected group is within an acceptable tolerance level. For example, let $n_T$ denote the number of transmit antennas at the base station and let K indicate the number of users connected to the base station. In conventional systems, the number of transmit antennas at the base station $n_T$ is smaller than the number of users K connected to the base station. Each user is equipped with $n_R$ receive antennas. The channel coefficients between each transmit antenna and each receive antenna at user k can be assembled into an $n_R \times n_T$ matrix $H_k$, k=1, . . . , K.

In a multi-user MIMO system that employs linear unitary pre-coding matrices, the base station can transmit concurrently to as many as $n_T$ users, which can be chosen from the population of K users. The relationship between transmit and receive signals can be represented as:

$$y = HUs + n \qquad (1)$$

where s is an $n_T$-dimensional vector containing the transmit signals, y is the $n_R$-dimensional vector of received signals, n is an $n_R$-dimensional noise vector, and U is an $n_T \times n_T$ unitary pre-coding matrix, i.e., a matrix satisfying $UU^H = I$. Note that some of the entries of s may be zero if the base station chooses to transmit to less than $n_T$ users (this is sometimes termed "rank adaptation"). Each base station typically stores a codebook consisting of L pre-coding matrices, $U_i$, i=1, . . . , L. Altogether, the L pre-coding matrices amount to $n_T \cdot L$ column vectors, where each column vector has $n_T$ entries.

The pre-coding matrices map the signals onto the available channels. The base station can vary this mapping to adapt to the channel conditions by selecting different pre-coding matrices based on the base station's knowledge of the matrices $H_k$, k=1, . . . , K. Information about the matrix $H_k$ can be reported to the base station using feedback from the mobile unit. For example, when the base station implements an opportunistic scheme, each user periodically reports a preferred subset of the column vectors in the codebook via the reverse link to the base station. The users also report a quality indicator corresponding to a hypothetical transmission associated with each preferred column. The size of the subset of columns that can be selected and reported by each user is a parameter that can be anywhere between 1 and $n_T \cdot L$. For each pre-coding matrix U, in the codebook, the base station identifies those users that have expressed preference for a column vector from that matrix $U_i$ and associates those users with that matrix $U_i$. Only one user can be associated with each column, so if several users have expressed preference for the same column vector of that matrix $U_i$, only one of those users is retained in the association (this can be done randomly or based on priorities). Thus, there are at most $n_T$ users associated with each matrix $U_i$. Note that each user could be associated with multiple pre-coding matrices $U_i$.

The base station selects one of the pre-coding matrices, e.g. on the basis of priorities of the users associated with the matrices $U_i$. The priorities can be determined by a scheduler in the base station. Once the matrix and associated users have been identified, the base station can begin concurrent transmission to the selected users using the corresponding pre-coding matrices $U_i$.

Base stations in conventional MIMO systems use a relatively small number of antennas (e.g., typically 2-4 antennas) to transmit and receive signals. The number of antennas is also typically significantly smaller than the number of users served by the base station. Consequently, the spatial channels can be determined using a reasonable amount of overhead to transmit feedback to the base station from the user equipment. Moreover, brute force techniques can be used to schedule packet transmissions over the channels by considering all possible combinations of users.

SUMMARY OF EMBODIMENTS

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for scheduling transmissions for an antenna array. One embodiment of the method includes scheduling a subset of a plurality of packets for concurrent transmission over an air interface to a corresponding subset of a plurality of wireless-enabled terminals. The subset is selected based on information indicating locations of the subset of the plurality of wireless-enabled terminals. This embodiment of the method also includes concurrently transmitting the subset of the plurality of packets using a plurality of antennas.

Embodiments of the method may include selecting a first packet destined for a first wireless-enabled terminal and selecting one or more second packets destined for at least one second wireless-enabled terminal based on the information indicating locations of the first and second wireless-enabled terminals.

Embodiments of the method may also include selecting the second packet(s) based upon at least one angular difference between angles-of-arrival of signals transmitted by the first and second wireless-enabled terminals and received by the plurality of antennas.

Embodiments of the method may also include selecting the second packet(s) based upon strengths of signals transmitted by the first and second wireless-enabled terminals and received by the plurality of antennas.

Embodiments of the method may also include selecting the second packet(s) based upon a function of a first parameter indicating at least one angular difference between angles-of-arrival of signals transmitted by the first and second wireless-enabled terminals and a second parameter indicating the strengths of signals transmitted by the first and second wireless-enabled terminals and received by the plurality of antennas.

Embodiments of the method may also include adding a packet to the subset when adding the packet to the subset increases an estimated sum rate for the transmission, removing a packet from the subset when removing the packet from the subset increases an estimated sum rate for the transmission, or swapping a packet that is in the subset with a packet that is not in the subset when swapping the packets increases an estimated sum rate for the transmission.

Embodiments of the method may also include determining the information indicating locations of the subset of the plurality of wireless-enabled terminals based on signals received by the plurality of antennas from at least the subset of the plurality of wireless-enabled terminals.

In another embodiment, an apparatus is provided for scheduling transmissions for an antenna array. One embodiment of the apparatus includes a scheduler configured to schedule a subset of a plurality of packets for concurrent transmission over an air interface to a corresponding subset of a plurality of wireless-enabled terminals. The subset is selected based on information indicating locations of the subset of the plurality of wireless-enabled terminals. This embodiment of the apparatus also includes a plurality of antennas for concurrently transmitting the subset of the plurality of packets.

Embodiments of the apparatus may also include a scheduler configured to select a first packet destined for a first wireless-enabled terminal and to select at least one second packet destined for at least one second wireless-enabled terminal based on the information indicating locations of the first and second wireless-enabled terminals.

Embodiments of the apparatus may also include at least one of a first proportionally fair scheduler, a scheduler that satisfies a fairness requirement, or a scheduler that satisfies QoS constraints of the system. In these embodiments, the first scheduler is configured to select the first packet and a second scheduler configured to select the second packet(s).

Embodiments of the apparatus may also include a scheduler configured to select the second packet(s) based upon at least one angular difference between angles-of-arrival of signals transmitted by the first and second wireless-enabled terminals and received by the plurality of antennas.

Embodiments of the apparatus may also include a scheduler configured to select the second packet(s) based upon strengths of signals transmitted by the first and second wireless-enabled terminals and received by the plurality of antennas.

Embodiments of the apparatus may also include a scheduler configured to select the second packet(s) based upon a function of a first parameter indicating an angular difference between angles-of-arrival of signals transmitted by the first and second wireless-enabled terminals and a second parameter indicating the strengths of signals transmitted by the first and second wireless-enabled terminals and received by the plurality of antennas.

Embodiments of the apparatus may also include a scheduler configured to add at least one packet to the subset when adding the packet to the subset increases an estimated sum rate for the transmission, and wherein the scheduler is configured to remove at least one packet from the subset when removing the packet from the subset increases an estimated sum rate for the transmission, and wherein the scheduler is configured swap at least one packet that is in the subset with at least one packet that is not in the subset when swapping the packets increases an estimated sum rate for the transmission.

Embodiments of the apparatus may also include a signal processor configured to determine the information indicating locations of the subset of the plurality of wireless-enabled terminals based on signals received by the plurality of antennas from at least the subset of the plurality of wireless-enabled terminals.

Embodiments of the apparatus may be implemented as part of a base station, a base station router, an access point, a macrocell, a microcell, a femtocell, or a picocell.

In yet another embodiment, a computer-readable medium is provided that includes information representing instructions that, when executed, perform a process for scheduling transmissions for an antenna array. One embodiment of the process includes scheduling a subset of a plurality of packets for concurrent transmission over an air interface to a corresponding subset of a plurality of wireless-enabled terminals. The subset is selected based on information indicating locations of the subset of the plurality of wireless-enabled terminals.

Embodiments of the process may also include concurrently transmitting the subset of the plurality of packets using a plurality of antenna during the same time slot.

Embodiments of the process may also include selecting a first packet destined for a first wireless-enabled terminal and selecting at least one second packet destined for at least one second wireless-enabled terminal based on the information indicating locations of the first and second wireless-enabled terminals.

In some embodiments of the process, the information indicating locations of the first and second wireless-enabled terminals may include at least one of an angular difference between angles-of-arrival of signals transmitted by the first and second wireless-enabled terminals and received by the plurality of antennas or strengths of signals transmitted by the first and second wireless-enabled terminals and received by the plurality of antennas.

Embodiments of the process may also include adding at least one packet to the subset when adding said at least one packet to the subset increases an estimated sum rate for the transmission, removing at least one packet from the subset when removing said at least one packet from the subset increases an estimated sum rate for the transmission, and/or swapping at least one packet that is in the subset with at least one packet that is not in the subset when swapping the packets increases an estimated sum rate for the transmission.

BRIEF DESCRIPTION OF THE DRAWINGS

The disclosed subject matter may be understood by reference to the following description taken in conjunction with the accompanying drawings, in which like reference numerals identify like elements, and in which:

FIG. 4 conceptually illustrates a pseudo-code program fragment that implements a method of scheduling terminals based on location information associated with the terminals.

Figure 1:
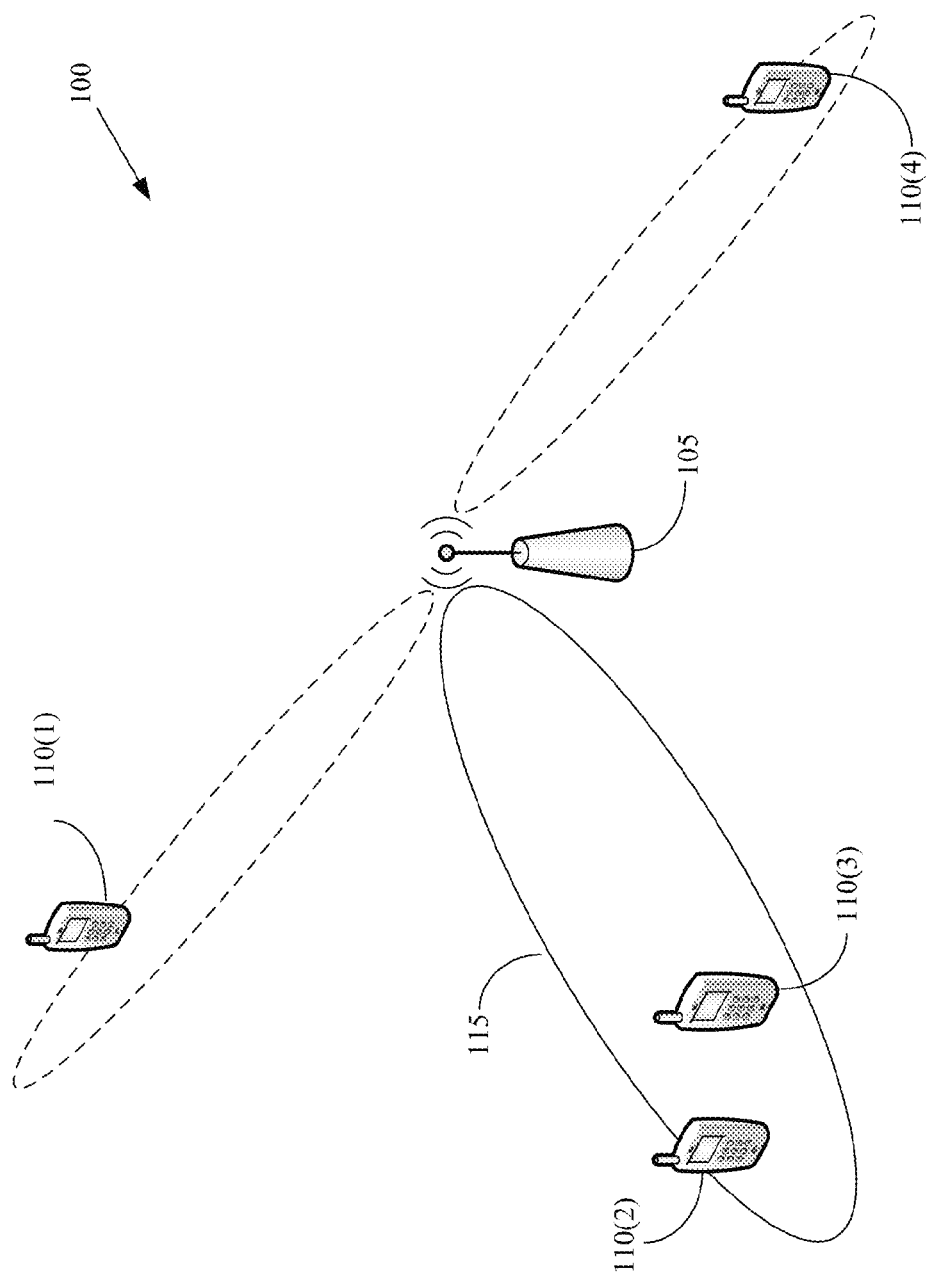
FIG. 1 conceptually illustrates a first exemplary embodiment of a wireless communication system that implements a greedy scheduling algorithm.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The present application describes embodiments of techniques for scheduling transmissions by an antenna array. In one embodiment, large numbers (e.g., more than 4) of antennas (M) concurrently serve a much smaller number of mobile terminals (K, where M>>K) using multiuser beamforming. Providing concurrent service to multiple users with a large ratio of antennas to terminals can yield large increases in both spectral efficiency and energy efficiency. Straightforward signal processing that implements conjugate beamforming on the forward link and matched filtering on the reverse link can asymptotically achieve near optimal performance as the number of service antennas increases and power is reduced.

However, when the number of antennas at the base station becomes large, and in particular when the number of antennas is much larger than the number of users served by the base station, the conventional brute force scheduling approach becomes impractical and in some cases impossible to implement. For example, the overhead required to determine all of the spatial channels for a large number of antennas would consume a significant percentage (if not all) of the available air interface resources. For another example, the time spent computing the sum rates and/or throughputs for all possible combinations of users increases exponentially as the number of users increases and so brute force techniques become impractical or impossible for large numbers of users. Greedy scheduling algorithms, which add users to the schedule one-by-one until the maximum throughput reaches a plateau, may become stuck in local minima and consequently greedy scheduling algorithms may pick less-than-optimal scheduling solutions.

FIG. 1 conceptually illustrates a first exemplary embodiment of a wireless communication system 100 that implements a greedy scheduling algorithm. The wireless communication system 100 may operate according to agreed-upon standards and/or protocols including, but not limited to, the standards and/or protocols established by the Third Generation Partnership Project (3GPP, 3GPP2). In the illustrated embodiment, the wireless communication system 100 includes one or more base stations 105 that are configured to schedule concurrent transmissions by multiple wireless-enabled terminals 110. Although a single antenna is shown in the conceptual illustration of the base station 105, the illustrated embodiment of the base station 105 includes multiple antennas. For example, the base station 105 may implement M>>4 antennas.

The base station 105 includes a scheduler that implements a greedy algorithm to schedule the terminals 110. However, persons of ordinary skill in the art having benefit of the present disclosure should appreciate that the scheduler may not necessarily be implemented in the base station 105 and may alternatively be implemented at other locations in the wireless communication system 100. In the illustrated embodiment, the scheduler in the base station 105 schedules the multiple wireless-enabled terminals 110 by first selecting and scheduling one of the terminals 110(2). The scheduler then selects another terminal and determines whether to schedule this terminal. For example, the scheduler may select the terminal 110(3) and then calculate an estimated sum rate to determine whether scheduling the additional terminal 110(3) improves the overall throughput. In the illustrated embodiment, the terminal 110(3) is scheduled because this improves the estimated overall throughput.

In the illustrated embodiment, the scheduled terminals 110 (2-3) are separated by a small angular difference. Larger numbers of antennas are typically required to create beams with smaller opening angles. Consequently, a relatively large number of antennas may be used to form the beam 115 that includes the schedule terminals 110(2-3). The greedy algorithm may therefore get stuck at a local minima corresponding to the two scheduled terminals 110(2-3) because the small angular difference may prevent further beamforming gains that could be realized by adding more terminals. For example, using the relatively large number of antennas to form the beam 115 may leave fewer antennas available for beamforming in other directions.

At least in part to address these drawbacks, the present application describes alternate embodiments that schedule packets for multiple users for transmission from the multiple antennas based on information indicating the locations of the multiple users or wireless-enabled terminals. This information can be obtained using uplink signals received at the multiple antennas. For example, the relative delays between signals received at different antennas from a user can be used to determine an angle-of-arrival of the signal. Packets for multiple users may therefore be scheduled based on the angular difference between the angle-of-arrivals of the signals from the different users. For another example, signal strengths of signals received at the antennas can be used to estimate distances from the base station to the users. Packets from multiple users may be scheduled based upon the differences between the distances. Furthermore, various functional combinations of the angle-of-arrival information, the distance information, and other location information may also be used to schedule the packets.

Figure 2:
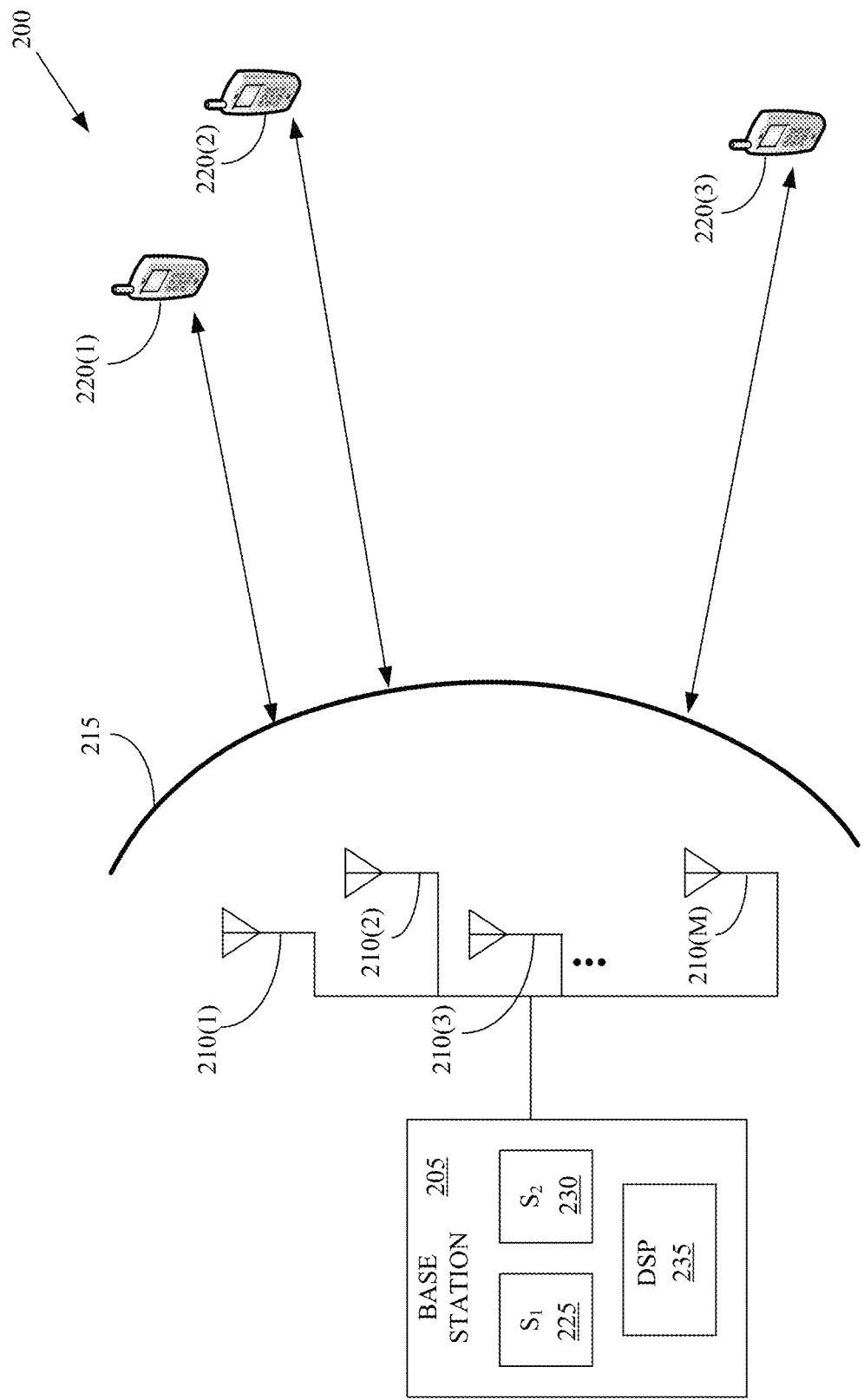
FIG. 2 conceptually illustrates a second exemplary embodiment of a wireless communication system.

FIG. 2 conceptually illustrates a second exemplary embodiment of a wireless communication system 200. In the illustrated embodiment, the wireless communication system 200 includes one or more base stations 205 that use a plurality of antennas 210(1-M) to communicate over an air interface 215 with multiple wireless-enabled terminals 220(1-K). Wireless-enabled terminals may include mobile devices such as mobile phones, smart phones, tablet computers, and laptop computers, as well as less mobile or immobile devices such as desktop computers. The number of antennas 210 may be larger than the number of wireless-enabled terminals 220 so that M>>K. Different embodiments of the wireless communication system 200 may implement different types of beamforming to support communication with the wireless-enable terminals 220. Furthermore, in alternative embodiments, the wireless communication system 200 may include other wireless access devices such as base station routers, access points, macrocells, microcells, femtocells, picocells, and the like. These alternative devices may also include multiple antennas and may be used in combination with or instead of the base stations 205 in other embodiments.

In one embodiment, the wireless communication system 200 implements a multi-user beamforming technique such as zero-forcing beamforming. Multiuser beamforming is a suboptimal, simplified version of the multiuser MIMO technology. On the uplink, different autonomous terminals 220 may transmit data in the same time/frequency slots and the base station 205 may utilize its channel knowledge to extract the individual data streams. On the downlink, the base station 205 may pre-code data streams based on its knowledge of channel state information (CSI) between the antennas 210 and the terminals 220 so that each terminal 220 can correctly decode its own data stream. Multiuser beamforming is considered to be more computationally tractable than the capacity-optimal multiuser MIMO solutions that may implement relatively complicated pre-coding methods such as dirty-paper coding. However, multiuser beamforming is not capacity-optimal. Zero-forcing beamforming employs linear pre-coding to create a transmission vector, s, by multiplying the K×1 vector of data-bearing symbols, q, by an M×K matrix A, s=Aq. In zero-forcing beamforming, the matrix A is defined as:

$$A = c \cdot G^* (G^T G^*)^{-1} \qquad (2)$$

Where G is the M×K channel matrix, c is a constant chosen to satisfy a power constraint, and the superscript "*" denotes the complex conjugate of the matrix. Zero-forcing beamforming can keep inter-terminal interference close to zero if K≤M.

Zero-forcing beamforming can be approximated by conjugate beamforming in embodiments where M/K→∞ $G^T G^* \sim I_K$ (the identity matrix). In conjugate beamforming, the matrix A is simplified to:

$$A = c \cdot G^* \qquad (3)$$

In other words, the problem of computing the matrix A is considerably simplified when the number of base station antennas is much larger than the number of terminals. The success of conjugate beamforming depends on the columns of the propagation matrix, G, becoming asymptotically orthogonal for M/K>>1. Asymptotic orthogonality may be achieved if there is line of sight propagation and the terminals 220 are randomly distributed in angle around the base station 205. Asymptotic orthogonality may also be achieved if the terminals 220 are deployed in a dense scattering environment. Either pre-coder may fail if the propagation matrix is inherently low-rank. The pseudo-inverse may be more difficult to compute but under some circumstances it may perform better than conjugate beamforming.

The base station 205 may utilize the array of antennas 210 to provide concurrent service to the K terminals 220, e.g., by transmitting symbols to the different terminals 220 concurrently within a single time slot or a plurality of sequential, non-sequential, interleaved, or consecutive time slots. The duration of each slot may be defined so that no one or nothing moves more than a quarter-wavelength for the duration of the slot. In one embodiment, the K terminals 220 may be a subset of a larger group of terminals that are served by the base station 205. Different subsets of terminals 220 can be served by the base station 205 in the conventional single-user communication scheme. In some embodiments, communication with one subset of terminals 220 can be orthogonal to communication with another subset of terminals 220.

Each terminal 220 can transmit a pilot signal over the uplink and reception of the pilot sequences by the service array 210 enables the wireless communication system 200 to estimate the up-link channel. Moreover, by virtue of time division duplex (TDD) reciprocity, the down-link channels may also be estimated using the pilot sequences received at the antennas 210 from the terminals 220. The channel-state information (CSI) may enable the base station 205 to distinguish the individual quadrature amplitude modulated (QAM) sequences on the up-link and to perform pre-coding on the down-link such that the terminals 220 only receive their respective QAM sequence. In one embodiment, the up-link pilots for active terminals 220 may be scheduled periodically.

The wireless communication system 200 includes functionality to schedule terminal traffic for the antenna array architecture to realize capacity and/or efficiency benefits. In the illustrated embodiment, the base station 205 includes schedulers 225, 230 that are configured to schedule terminals 220 based in part on information that indicates the locations of the terminals 220, as discussed herein. However, persons of ordinary skill in the art having benefit of the present disclosure should appreciate that the wireless communication system 200 may implement other schedulers at other locations for scheduling the terminals 220. Furthermore, the base station 205 may alternately implement a single scheduler instead of multiple schedulers 225, 230. The schedulers 225, 230 are configured to schedule terminals 220 to increase the overall system throughput subject to the limits imposed by the total available transmission power of the base station 205.

In the illustrated embodiment, the schedulers 225, 230 optimize the power allocation among terminals in the set E by maximizing an estimate of the sum rate over the set E. The maximization can be expressed as:

$$\max \sum_{i \in E} \log\left(1 + \frac{q_i^*(G^T)*(G^T)q_i}{\sigma^2}\right) \quad (4)$$

subject to the constraint on the available base station transmission power, P:

$$\Sigma_{i \in E} q_i^* A^* A q_i \leq P, \quad (5)$$

where $q_i$ is a K×1 vector that is transmitted by an antenna indicated by the index i and $\sigma^2$ in the noise power. The packet schedulers 225, 230 attempt to determine the best set of terminals E to schedule in each time slot.

The schedulers 225, 230 may schedule the terminals using information that indicates locations of the terminals 220. In one embodiment, the base station 205 includes a digital signal processor (DSP) 235 that is configured to use signals, such as pilot signals, received at the antennas 210 to determine the location information. Exemplary location information may include angles-of-arrival for signals received from the terminals 220, which may be determined by measuring the relative delays between signals. Location information may also include strength of the signals received from the terminals 220. The relative signal strengths of the different terminals 220 may indicate the distance of the terminals 220 from the base station 205. The DSP 235 may also be configured to define parameters that are functions of the delays, angles-of-arrival, signal strengths, distances, and other measures of the locations of the terminals 220.

Figure 3:
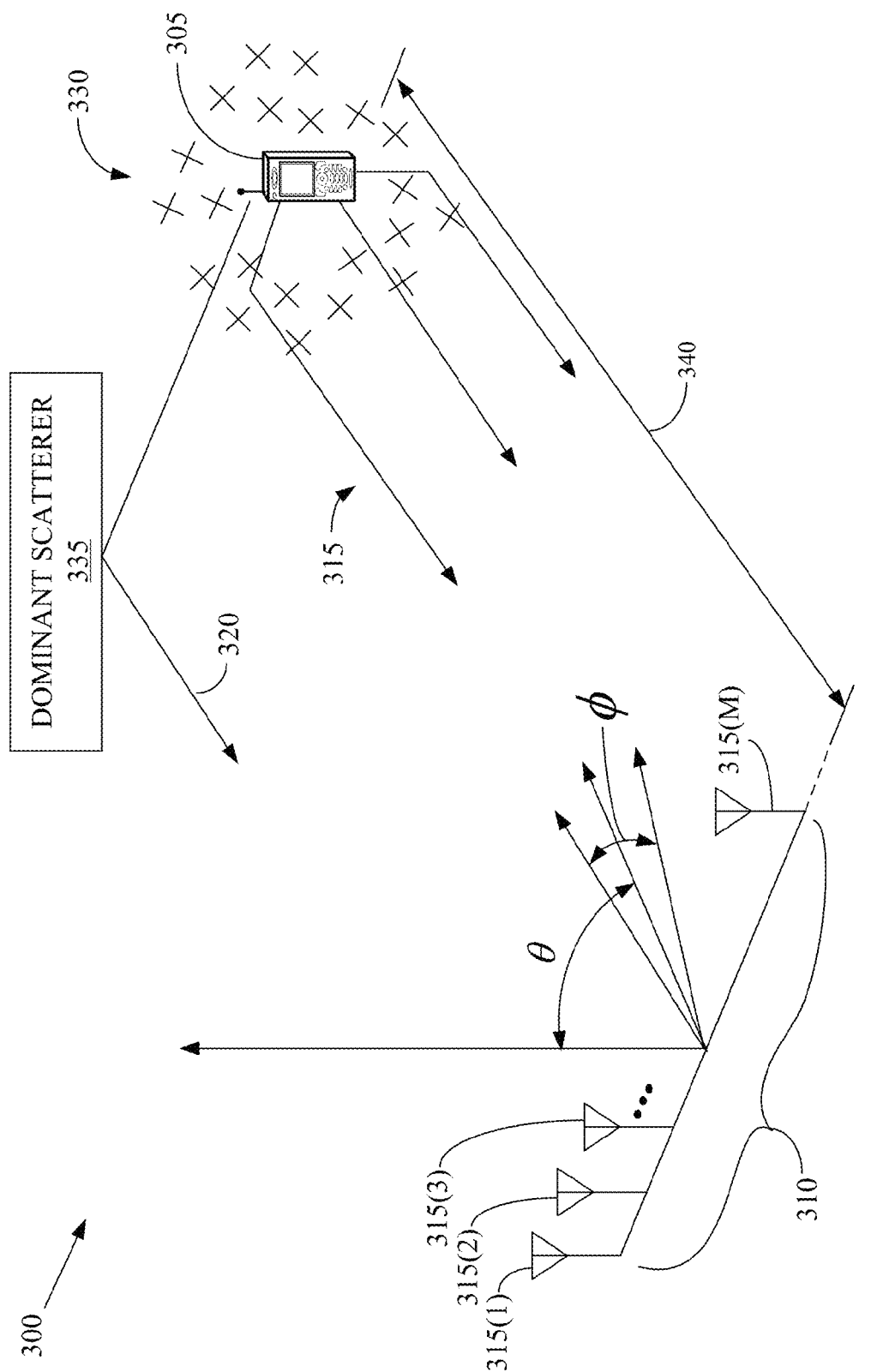
FIG. 3 conceptually illustrates a third exemplary embodiment of a wireless communication system.

FIG. 3 conceptually illustrates a third exemplary embodiment of a wireless communication system 300. In the illustrated embodiment, the wireless communication system 300 includes a mobile device 305 and a base station 310, which may include one or more antennae 315. In the illustrated embodiment, the mobile device 305 is a smart phone. However, in alternative embodiments, the mobile device 305 may be any wireless-enabled device capable of communicating with the base station 310 over channels of an air interface. For example, the mobile device 305 may be a cellular telephone, a tablet computer, a Global Positioning System receiver, a laptop computer, a desktop computer, a wireless modem, and the like. The base station 310 may use measurements of signals 320, 325 received at the antennae 315 to determine Doppler shifts, time delays, angles-of-arrival, signal strengths, and other parameters such as angle deviations, angle spread, and standard deviations of measurements. These parameters and various statistical and/or functional combinations of these parameters may be indicative of the location of the mobile device 305 and may be used in different embodiments of the scheduling techniques described herein.

Signals 320, 325 from the mobile device 305 may be distorted or otherwise altered as they travel to the base station 310. In one embodiment, the alterations may arise in part because the mobile device 305 is moving. For example, a user may be using the mobile device 305 while walking, riding in a car, and the like. Doppler spreading of the signals 320, 325 from the moving mobile device 305 may shift the signal frequency and/or cause temporal fading of the signals 320, 325. Alternatively, the base station 310 may be in motion. For example, high winds may cause an antenna tower (not shown) supporting the antennae 315 to sway. Persons of ordinary skill in the art should appreciate that the Doppler spreading of the signals 320, 325 may also be referred to using terms such as "Doppler fading," "Doppler shift," and the like.

The signals 320, 325 may be scattered as they travel from the mobile device 305 to the base station 310. In the conceptual illustration shown in FIG. 3, the scattering may include random scattering from many uncorrelated or correlated scatterers 330, such as, trees, vehicles, and the like. The signals 320, 325 may also be scattered by one or more dominant scatterers 335, such as buildings, mountains, and the like. Persons of ordinary skill in the art should appreciate that the various parameters of the random and/or dominant scatterers 330, 335, such as a size, number, distribution, and/or density of the scatterers 330, 335, may depend upon the environment of the mobile device 305 and/or the base station 310. For example, the number and density of scatterers 330, 335 may be much larger in urban environments than in suburban environments.

Scattering of the signals 320, 325 may spread the time delay of the signals 320, 325, at least in part because of variations in the path length from the mobile device 305 to the base station 310. Persons of ordinary skill in the art should appreciate that the time delay spreading may also be referred to using terms such as "multipath delay spread," and the like. Scattering of the signals 320, 325 may also spread the angle-of-arrival of the signals 320, 325. Persons of ordinary skill in the art should appreciate that the angle spreading may also be referred to using terms such as "angle fading," "spatial fading," "spatial diversity," and the like. In the embodiment depicted in FIG. 3, a nominal angle-of-arrival may be denoted by θ and a random angle deviation from the nominal angle-of-arrival may be denoted by the symbol φ. In one embodiment, scattering of the signals 320, 325 may spread the nominal angle-of arrival such that the angle deviation φ is approximately distributed as a Gaussian or uniformly distributed random variable with variance $\sigma_\phi^2$. The standard deviation $\sigma_\phi$ of the angle deviation is often called the "angle spread" of the signals 320, 325. However, persons of ordinary skill in the art should appreciate that the distribution and/or angle spread of the nominal angle-of-arrival may not always be Gaussian and may depend upon many parameters including, but not limited to, the distribution of the transmitted signals 320, 325, the distribution of the scatterers 330, 335, and the like.

A distance 340 between the base station 310 and the mobile unit 305 may also be determined using the uplink signals 315. The strength of uplink signal 315 received at the base station 310 decreases as the distance 340 increases and so the measured signal strengths can be used as an indicator of the distance 340. In one embodiment, the base station 310 measures signal strengths of the received uplink signals 315 and uses the measured values to calculate or estimate the distance 340. As discussed herein, scattering of the signal 315, 320 may introduce spatial fading, which may in turn introduce variations in the measured strengths of the received uplink signal 315, 320. The base station 310 may therefore perform statistical analyses to account for these variations and make a best-guess estimate of the distance 340. For example, statistical techniques may be used to detect the outlier signal 320 that results from scattering off the dominant scatterers 335.

The strength of the outlier uplink signal 320 may be smaller and indicative of a distance that is larger than the distance 340 because the outlier uplink signal 320 may have traveled a significantly larger distance. The signal 320 may therefore be removed before calculating the distance 340.

Different embodiments of the base station 310 may therefore be able to calculate the angle-of-arrival for the uplink signals 315, 320, the distance 340 to the terminal 305, or both parameters. These parameters may be used individually in different embodiments of the scheduling algorithms described herein. Alternatively, both parameters can be taken into account, e.g., using functional or statistical combinations of the parameters that indicate the location of the terminal 305.

FIG. 4 conceptually illustrates a pseudo-code program fragment that implements a method 400 of scheduling terminals based on location information associated with the terminals. The illustrated embodiment of the method 400 is discussed herein with reference to the second embodiment of the wireless communication system 200 depicted in FIG. 2. However, persons of ordinary skill in the art having benefit of the present disclosure should appreciate that the system 200 and the method 400 are illustrative embodiments. Alternative embodiments may be implemented in different types of communication systems and/or using different programs or methods to perform the scheduling. In the illustrated embodiment, the scheduler 225 initially selects terminal 220(2) and schedules one or more packets $pkt_1$ for the terminal 220(2) in the current time slot. For example, the scheduler 225 may use proportional fairness scheduling to select and schedule packets $pkt_1$ for the terminal 220(2). Other examples may include schedulers 225 that satisfy other fairness requirements and/or a scheduler 225 that satisfies QoS constraints of the system. The scheduled packets $pkt_1$ may be transmitted on the downlink during the scheduled time slot.

Scheduler 230 may then be used to initialize a set of packets by adding the packet $pkt_1$ to a set of packets PKT for beamforming. In the illustrated embodiment, the set of packets PKT includes packets for the terminals that are scheduled for concurrent transmission during the same time slot. The scheduler 230 may then examine the first scheduled packet from each of the remaining terminals. This set of packets may be denoted PKT1. In one embodiment, the scheduler 230 may consider a subset of packets PKT2 from the set of packets PKT1. The subset of packets PKT2 is from terminals 220 that have accurate channel estimates over the air interface to the antennas 210. The scheduler 230 then determines whether to choose packets for each of the terminals 220 for scheduling in the current time slot. In the illustrated embodiment, the method 400 may perform three operations: ADD to add a terminal's packet into PKT, REMOVE to remove a terminal's packet from PKT, and SWAP to swap a terminal's packet that is outside PKT with a terminal's packet inside PKT. Persons of ordinary skill having benefit of the present disclosure should appreciate that alternative embodiments of the method 400 may use alternative operations to select the contents of PKT for concurrent transmission in the current time slot.

In the illustrated embodiment of method 400, an operation may be selected randomly or in a predetermined order at each step. For example, the method 400 may first determine whether to perform on or more of the operations for a particular packet pkt in the subset PKT2. The scheduler 230 chooses the packet based upon location information associated with the terminals 220. In the illustrated embodiment, the scheduler 230 picks the packet pkt associated with the terminal 220 that has the maximum angular difference from terminal 220(2). For example, the terminal 220(3) has a larger angular separation from the terminal 220(2) than the terminal 220(1). Alternatively, the scheduler 230 picks the packet pkt associated with the terminal 220 that is the furthest from terminal 220(2), e.g., as indicated by the location estimates for the terminals 220. In other alternative embodiments, the scheduler 230 can pick the packet pkt based on various functional combinations of angles-of-arrival and locations associated with the terminals 220, e.g. the angular separation divided by distance separation.

To perform the ADD operation, the scheduler 230 adds the selected packet pkt into the set of packets PKT. In the illustrated embodiment, the scheduler 230 has selected the packet pkt associated with the terminal 220(3). The scheduler 230 then estimates the sum rate $(r_{sum})$ for the modified set of packets PKT. The sum rate $(r_{sum})$ may be calculated using a beamforming method that is used in the communication system 200, e.g. conjugate or zero-forcing beamforming. If addition of the packet pkt to the set of packets PKT increases the sum rate, pkt is added into the set of packets PKT to be transmitted. If not, this packet is skipped, i.e. the packet pkt is not added to the set of packets PKT and it is removed from set PKT2. The scheduler 230 may then choose another packet from PKT2 and determine whether to add this packet to the set of packets PKT. The next packet may be associated with the terminal 220 that has an angle-of-arrival that maximizes the minimal angular difference with previous selected terminals. Alternatively, as discussed herein, the next packet may be selected based on other location parameters or combinations of these parameters.

The scheduler 230 may also determine whether to remove packets from the set of packets PKT using the REMOVE operation. In the illustrated embodiment, the scheduler 230 preferentially removes packets that have relatively smaller angular spreads from other packets in the set PKT. For example, packet $pkt_i$ may be considered for removal because it has the minimal angular spread $\theta_i$ in PKT−${pkt_i}$. The packets of PKT may therefore be sorted by decreasing order of $\theta_i$ and then considered one-by-one in the order indicated by the sorted list. If the sum rate increases when the packet under consideration is removed from the set PKT, then the packet under consideration is removed from the set PKT and the remove operation is stopped. The scheduler 230 may further perform a SWAP operation. For each packet not in PKT, the scheduler 230 attempts swap this packet with a packet in PKT such that the angular spread of the packets in the set PKT is maximized.

The scheduler 230 iterates the process of adding, removing, and/or swapping packets until the sum rate does not increase (e.g., the sum rate reaches a plateau and any deviations/variations are within a predetermined tolerance such as 1% or less) or until the scheduler 230 has considered all of the packets that are ready for transmission by the terminals 220. In the illustrated embodiment, the schedulers 225, 230 operate on the same set of packets. The scheduler 225 picks the first packet and the scheduler 230 picks the rest for beamforming. Scheduler 225 maintains fairness and scheduler 230 opportunistically optimizes the beamforming gain in a greedy fashion. The algorithm implemented in the illustrated embodiment of the method 400 is a local search algorithm that favors larger angular differences among terminals 220. This approach therefore differs from the conventional greedy algorithm by scheduling the packets based on the angle-of-arrival to avoid getting stuck in local minima. Persons of ordinary skill in the art having benefit of the present disclosure should appreciate that alternative embodiments of the method 400 may use other location information, as described herein, to schedule the packets. Embodiments of the scheduling problem described herein may be non-convex and non-linear.

Referring back to FIG. 2, embodiments of the wireless communication system 200 may have a number of advantages over conventional systems. For example, a single cell approximation can be used to analyze the aggregate cell capacity of the antenna array 210. The illustrated embodiment of the base station 205 incorporates M antennas that serve K terminals 220 within one slot comprising T symbols. In the illustrated embodiment, the time slot is used for up-link pilot transmission and down-link data transmission. The duration of the orthogonal pilot sequences is t, where K≤t≤T. The propagation matrix comprises independent Rayleigh fading and the propagation coefficients are not known. The expected uplink signal-to-noise ratio (SNR) is denoted by $\rho_r$ and the expected down-link SNR is denoted by $\rho_f$. The SNR is defined herein with respect to a single antenna transmitting and a single antenna receiving. The instantaneous aggregate capacity (bits/symbol), C, can be shown to be lower bounded as:

$$C \geq K \cdot \log_2\left[1 + \frac{M}{K}\left(\frac{\rho_f}{1+\rho_f}\right)\left(\frac{\rho_r \tau}{1+\rho_r \tau}\right)\right] \quad (6)$$

The relationship in equation (6) shows that increasing M, or having more antennas 210, increases the capacity of the cell. A large M can therefore compensate for poor quality channel estimate, as measured by the product $\rho_T \tau$, as well as for reduced total transmitted power, as measured by $\rho_f$. On the other hand, increasing the number of concurrently serviced terminals, K, may not necessarily increase the cell capacity at least in part because the amount of time required to send up-link pilot signals is proportional to K.

The relationship in equation (6) also shows that incorporating numerous antennas 220, or a large M, allows the same aggregate capacity to be achieved with smaller total transmitted power ($\rho_f$), relative to systems that incorporate a smaller number of antennas (e.g., M≤4) or a single antenna. With very large M, the base station 205 can achieve higher aggregate capacity with total transmission power that is orders of magnitude lower than the total transmission power required for a conventional base station that incorporates a smaller number of antennas (e.g., M≤4). Moreover, a traditional base station antenna employs a high-output power amplifier to deliver the required transmission power of 20 to 40 Watt. The high-output power amplifier consumes very high power and requires cooling equipment that not only consumes extra power but also takes extra real estate. According to some conventional estimates, the cooling can contribute about 50% of the operational cost of a traditional base station. In contrast, we envision embodiments of the antenna array such as the antennas 210 may have much lower power requirements, e.g. several Watts or several tenths of a Watt. Consequently, the base station 205 and/or the antennas 210 may not require any cooling equipment and may have a much lower operational cost than a traditional base station serving a similar or even higher capacity.

Embodiments of the base station 205 and the antenna array 210 may also support a very useful tradeoff between spectrum and energy efficiencies. Using the down-link for example, the spectrum efficiency may be measured by the net aggregate throughput by including a factor that is equal to the fraction of time spent transmitting data, (1−t/T)·C. The down-link energy efficiency can be measured $C/\rho_f$. Therefore, by varying $\rho_f$, the base station 205 enables flexible tradeoff between down-link spectrum efficiency and energy efficiency. A similar tradeoff exists for up-link transmissions. This flexibility can be used to adapt to different loadings of the cell. For example, spectrum efficiency is preferred in a highly loaded period of a cell and energy efficiency is preferred during a lightly loaded period.

Figure 5:
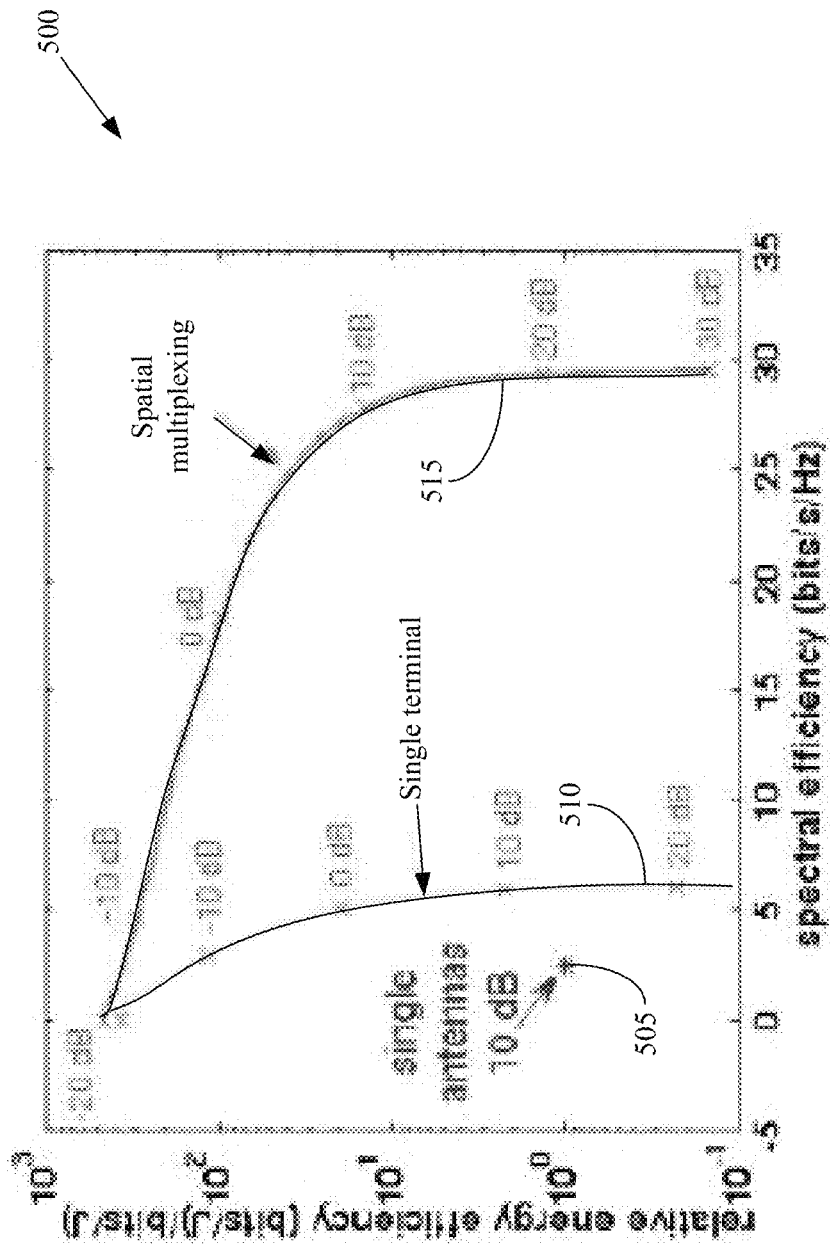
FIG. 5 depicts results of a simulation that illustrates the trade-off between relative energy efficiency and spectral efficiency.

FIG. 5 depicts results 500 of a simulation that illustrate the trade-off between relative energy efficiency and spectral efficiency for the case of M=100 service antennas, K=1 terminal (curve 510), and K>1 (curve 515). The vertical axis indicates the relative energy efficiency and the horizontal axis indicates the spectral efficiency. The results 500 depict energy-efficiency as a relative quantity that is calculated relative to that of a reference scenario comprising a conventional single-antenna link with a forward pilot. The transmission occurs in a slot that consists of T=98 symbols (corresponding to a 500 micro-second slot-duration and a channel delay-spread of 4.76 micro-seconds). The expected SNR of the up-link is 0 dB ($\rho_T$=1), and for the reference scenario the expected SNR of the down-link is 10 dB. The asterisk 505 corresponds to the reference scenario that has a spectral efficiency of 2.55 bits/symbol and relative energy-efficiency of one. The curve 510 was computed assuming a spectral efficiency as a constraint and subject to the constraint on the total downlink power, $\rho_f$. The amount of training in the time period 1≤t≤T was adjusted to maximize the energy-efficiency.

A similar optimization yielded the curve 515, with an additional parameter (K) over which to optimize subject to the constraint K≤t≤T. The points on the curves indicate the total down-link power, e.g. 10 dB corresponds to the same power used in the reference scenario. The plots in FIG. 5 demonstrate that M=100 service antennas yield 100-fold improvements in radiated energy-efficiency compared with the reference scenario. For K=1 terminal this is accomplished by reducing power by a factor of 100 compared with the reference scenario, while maintaining comparable spectral efficiency. For K>1 terminals this is accomplished by reducing power by a factor of 10 and increasing spectral efficiency by a factor of eight. The ability to change the operating point—high energy-efficiency and low spectral efficiency when demand is low, and the converse when demand is high—should be attractive to service providers.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
scheduling a subset of a plurality of packets for concurrent transmission over an air interface to a corresponding subset of a plurality of wireless-enabled terminals, wherein the subset of the plurality of packets is selected based on information indicating angles-of-arrival of signals transmitted by the plurality of wireless-enabled terminals and received by a plurality of antennas; and
concurrently transmitting the subset of the plurality of packets using the plurality of antennas.

2. The method of claim 1, wherein scheduling the subset of the plurality of packets comprises:
selecting a first packet destined for a first wireless-enabled terminal; and
selecting at least one second packet destined for at least one second wireless-enabled terminal based on at least one angular difference between angles-of-arrival of signals transmitted by the first and second wireless-enabled terminals and received by the plurality of antennas.

3. The method of claim 2, wherein selecting said at least one second packet comprises selecting said at least one second packet further based upon strengths of signals transmitted by the first and second wireless-enabled terminals and received by the plurality of antennas.

4. The method of claim 3, wherein selecting said at least one second packet comprises selecting said at least one second packet based upon a function of a first parameter indicating the at least one angular difference and a second parameter indicating the strengths of signals transmitted by the first and second wireless-enabled terminals and received by the plurality of antennas.

5. The method of claim 1, wherein scheduling the subset of the plurality of packets comprises adding at least one packet to the subset when adding at least one packet to the subset increases an estimated sum rate for the transmission, removing at least one packet from the subset when removing said at least one packet from the subset increases an estimated sum rate for the transmission, or swapping at least one packet that is in the subset with at least one packet that is not in the subset when swapping the packets increases an estimated sum rate for the transmission.

6. An apparatus, comprising:
a scheduler configured to schedule a subset of a plurality of packets for concurrent transmission over an air interface to a corresponding subset of a plurality of wireless-enabled terminals, wherein the subset of the plurality of packets is selected based on information indicating angles-of-arrival of signals transmitted by the subset of the plurality of wireless-enabled terminals and received by a plurality of antennas; and
the plurality of antennas for concurrently transmitting the subset of the plurality of packets.

7. The apparatus of claim 6, wherein the scheduler is configured to select a first packet destined for a first wireless-enabled terminal and to select at least one second packet destined for at least one second wireless-enabled terminal based on at least one angular difference between angles-of-arrival of signals transmitted by the first and second wireless-enabled terminals and received by the plurality of antennas.

8. The apparatus of claim 7, wherein the scheduler comprises at least one of a first proportionally fair scheduler, a scheduler that satisfies a fairness requirement, or a scheduler that satisfies QoS constraints, and wherein the first scheduler is configured to select the first packet and a second scheduler configured to select said at least one second packet.

9. The apparatus of claim 7, wherein the scheduler is configured to select said at least one second packet further based upon strengths of signals transmitted by the first and second wireless-enabled terminals and received by the plurality of antennas.

10. The apparatus of claim 9, wherein the scheduler is configured to select said at least one second packet based upon a function of a first parameter indicating the at least one angular difference and a second parameter indicating the strengths of signals.

11. The apparatus of claim 6, wherein the scheduler is configured to add at least one packet to the subset when adding said at least one packet to the subset increases an estimated sum rate for the transmission, and wherein the scheduler is configured to remove at least one packet from the subset when removing said at least one packet from the subset increases an estimated sum rate for the transmission, and wherein the scheduler is configured swap at least one packet that is in the subset with at least one packet that is not in the subset when swapping the packets increases an estimated sum rate for the transmission.

12. The apparatus of claim 6, wherein the apparatus is implemented as part of at least one of a base station, a base station router, an access point, a macrocell, a microcell, a femtocell, or a picocell.

13. A non-transitory computer-readable medium comprising information representing instructions that, when executed, perform a process comprising:
scheduling a subset of a plurality of packets for concurrent transmission over an air interface to a corresponding subset of a plurality of wireless-enabled terminals, wherein the subset of the plurality of packets is selected based on information indicating angles-of-arrival of signals transmitted by the plurality of wireless-enabled terminals and received by a plurality of antennas.

14. The non-transitory computer-readable medium set forth in claim 13, wherein the instructions, when executed, perform a process comprising concurrently transmitting the subset of the plurality of packets using the plurality of antenna during the same time slot.

15. The non-transitory computer-readable medium set forth in claim 13, wherein the instructions, when executed, perform a process comprising:
  selecting a first packet destined for a first wireless-enabled terminal; and
  selecting at least one second packet destined for at least one second wireless-enabled terminal based on at least one of an angular difference between angles-of-arrival of signals transmitted by the first and second wireless-enabled terminals and received by the plurality of antennas.

16. The non-transitory computer-readable medium set forth in claim 15, wherein the instructions, when executed, perform a process comprising:
  selecting the at least one second packet further based on strengths of signals transmitted by the first and second wireless-enabled terminals and received by the plurality of antennas.

17. The non-transitory computer-readable medium set forth in claim 13, wherein the instructions, when executed, perform a process comprising at least one of adding at least one packet to the subset when adding said at least one packet to the subset increases an estimated sum rate for the transmission, removing at least one packet from the subset when removing said at least one packet from the subset increases an estimated sum rate for the transmission, or swapping at least one packet that is in the subset with at least one packet that is not in the subset when swapping the packets increases an estimated sum rate for the transmission.

18. A method, comprising:
  scheduling a subset of a plurality of packets for concurrent transmission over an air interface to a corresponding subset of a plurality of wireless-enabled terminals, wherein the subset of the plurality of packets is selected based on information indicating locations of the subset of the plurality of wireless-enabled terminals, wherein scheduling the subset of the plurality of packets comprises adding at least one packet to the subset when adding said at least one packet to the subset increases an estimated sum rate for the transmission, removing at least one packet from the subset when removing said at least one packet from the subset increases an estimated sum rate for the transmission, or swapping at least one packet that is in the subset with at least one packet that is not in the subset when swapping the packets increases an estimated sum rate for the transmission; and
  concurrently transmitting the subset of the plurality of packets using a plurality of antennas.

19. An apparatus, comprising:
  a scheduler configured to schedule a subset of a plurality of packets for concurrent transmission over an air interface to a corresponding subset of a plurality of wireless-enabled terminals, wherein the subset of the plurality of packets is selected based on information indicating locations of the subset of the plurality of wireless-enabled terminals, and wherein the scheduler is configured to: add at least one packet to the subset when adding said at least one packet to the subset increases an estimated sum rate for the transmission; remove at least one packet from the subset when removing said at least one packet from the subset increases an estimated sum rate for the transmission; and swap at least one packet that is in the subset with at least one packet that is not in the subset when swapping the packets increases an estimated sum rate for the transmission; and
  a plurality of antennas for concurrently transmitting the subset of the plurality of packets.

* * * * *